3,763,141
SUBSTITUTED AZOBENZENE COMPOUNDS
Max A. Weaver and Herman S. Pridgen, Kingsport, Tenn., assignors to Eastman Kodak Company, Rochester, N.Y.
No Drawing. Filed May 13, 1968, Ser. No. 728,788
Int. Cl. C07c 107/06; C09b 29/24
U.S. Cl. 260—207   13 Claims

ABSTRACT OF THE DISCLOSURE

Monoazo compounds containing a substituted phenyl diazo component and an N,N-di-aralkyl-aniline coupling component in which a ring carbon atom of the aniline coupling component bears an acylamido group. The monoazo compounds are useful as dyes for polyester textile materials.

---

This invention relates to certain novel, monoazo compounds and, more particularly, to monoazo compounds useful as dyes for polyester textile materials and to polyester textile materials dyed with the novel compounds.

The novel azo compounds of the invention have the formula (I)
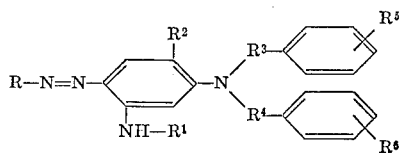

wherein

R is a substituted phenyl group;
$R^1$ is an acyl group;
$R^2$ is hydrogen, lower alkyl, or lower alkoxy;
$R^3$ and $R^4$ are the same or different and each is alkylene of 1 to about 2 carbon atoms; and
$R^5$ and $R^6$ are the same and each is hydrogen, lower alkyl, lower alkoxy or halogen.

When applied to polyester textile materials according to conventional dyeing procedures, the compounds of the invention exhibit improved build-up, excellent brightness, and superior fastness properties, such as fastness to light and resistance to sublimation. The novel azo compounds impart various shades, ranging from yellow to blue, to polyester fibers. The improved fastness properties possessed by the novel azo compounds allows them to be employed in the dyeing of cotton-polyester fabrics receiving durable press processing. The superior sublimation fastness possessed by the compounds of the invention renders them particularly useful in the thermal fixation technique of dyeing polyester materials.

Examples of the substituents present on the phenyl group represented by R include nitro, halogen, lower alkylsulfonyl, formyl, lower alkanoyl, lower alkoxycarbonyl, cyano, trifluoromethyl, sulfamoyl, lower alkylsulfamoyl, carbamoyl, lower alkylcarbamoyl, thiocyanato, etc. As used herein to describe a group containing an alkyl moiety, "lower" designates a carbon content from 1 to about 4 carbon atoms. The alkanoyl groups can be substituted with substituents such as halogen, phenyl, cyano, lower alkoxy, hydroxy, lower alkylsulfonyl, phenyl, etc. The alkylsulfonyl groups can also be substituted, for example, with cyano, hydroxy, halogen and the like. Typical of the groups, containing an alkyl moiety, which can be present on phenyl radical R are methylsulfonyl, ethylsulfonyl, propylsulfonyl, butylsulfonyl, acetyl, propionyl, isobutyryl, methoxycarbonyl, ethoxycarbonyl, butoxycarbonyl, dimethylsulfamoyl, ethylsulfamoyl, propylsulfamoyl, dibutylsulfamoyl, methylcarbamoyl, diethylcarbamoyl, butylcarbamoyl, etc. Chlorine and bromine are typical halogen atoms which can be present on phenyl radical R.

Illustrative of the phenyl groups which R can represent are 2-chloro-4-nitrophenyl,
4-nitrophenyl,
2-chloro-4-methylsulfonyl,
2,4-di(methylsulfonyl)phenyl,
2-methylsulfonyl-4-nitrophenyl,
2-nitro-4-methylsulfonylphenyl,
2-acetyl-4-nitrophenyl,
2-ethoxycarbonyl-4-nitrophenyl,
2,4-dinitro-6-chlorophenyl,
2-cyano-4,6-dinitrophenyl,
4-methoxycarbonylphenyl,
2-ethylsulfonyl-4,6-dinitrophenyl,
2-formyl-4,6-dinitrophenyl,
2,4-dinitro-6-propionylphenyl,
2-ethoxycarbonyl-4,6-dinitrophenyl,
2-trifluoromethyl-4-nitrophenyl,
2,4-dicyanophenyl,
2-bromo-6-cyano-4-nitrophenyl,
4-nitro-2-sulfamoylphenyl,
2-nitro-4-(dimethyl)sulfamoylphenyl,
4-cyanophenyl,
4-methylsulfonylphenyl,
4-trifluoromethylphenyl,
4-chlorophenyl,
4-ethylsulfamoylphenyl,
4-acetylphenyl,
4-ethylcarbamoylphenyl,
2-carbamoyl-4-nitrophenyl,
2-methylsulfonyl-4-thiocyanophenyl,
2,6-dichloro-4-nitrophenyl,
2-nitro-4-thiocyanatophenyl,
2-chloro-6-cyano-4-nitrophenyl,
2-cyano-4-nitrophenyl,
2-chloro-4-cyanophenyl,
2-chloro-4-ethoxycarbonylphenyl, and the like. Preferably, the substituted phenyl group R contains not more than three substituents at the para and ortho positions.

The acyl groups represented by $R^1$ can be formyl, lower alkanoyl, aroyl, cyclohexylcarbonyl, lower alkoxycarbonyl, aryloxycarbonyl, lower alkylsulfonyl, arylsulfonyl, carbamoyl, lower alkylcarbamoyl, arylcarbamoyl, furoyl, etc. The alkanoyl and alkylsulfonyl groups can be substituted as described above in the definition of R. Acetyl, propionyl, butyryl, cyanoacetyl, chloroacetyl, phenylacetyl, methoxyacetyl, methylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-hydroxyethylsulfonyl, and 2-chloroethylsulfonyl are examples of the alkanoyl, alkoxycarbonyl, and alkylsulfonyl groups which $R^1$ can represent. The aryl group of the aroyl, aryloxycarbonyl, arylsulfonyl, and arylcarbamoyl group is preferably monocyclic, carbocyclic aryl such as unsubstituted phenyl and phenyl substituted with, for example, lower alkyl, lower alkoxy, halogen, hydroxy, etc. Tolyl, anisyl, p-bromophenyl, and o,p-dichlorophenyl are typical of such aryl groups. Dimethylcarbamoyl, ethylcarbamoyl, propylcarbamoyl, and butylcarbamoyl are illustrative alkylcarbamoyl groups which $R^1$ can represent.

Methylene, ethylene, methyl, ethyl, propyl, butyl, methoxy, ethoxy, butoxy, chlorine, and bromine are examples of the substituents which each of $R^3$, $R^4$, $R^5$ and $R^6$, as defined above, can represent.

Particularly good dyeings on polyester materials are obtained by applying to such materials a compound of group A or group B described below.

(A)
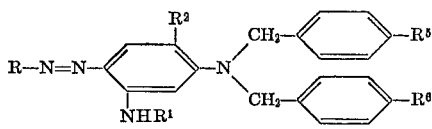

wherein

R is 2-chloro-4,6-dinitrophenyl, 2-bromo-4,6-dinitrophenyl, 2-formyl-4,6-dinitrophenyl, 2-lower alkanoyl-4,6-dinitrophenyl, 2 - lower-alkoxycarbonyl-4,6-dinitrophenyl, or 2-trifluoro-4,6-dinitrophenyl;

$R^1$ is lower alkanoyl, benzoyl, lower alkylsulfonyl, lower alkoxycarbonyl, or lower alkylcarbamoyl;

$R^2$ is methoxy or ethoxy; and $R^5$ and $R^6$ each is hydrogen, methyl, methoxy, or chlorine.

(B)
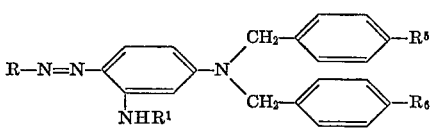

wherein

R is 2-chloro-4-nitrophenyl, 2-bromo-4-nitrophenyl, 4-nitrophenyl, 2-chloro-4-lower alkylsulfonylphenyl, 2-bromo-4-lower alkylsulfonylphenyl, 2,4-di(lower alkylsulfony)phenyl, 2-lower alkylsulfonyl-4-nitrophenyl, 2-lower alkylsulfonyl-4-thiocyanatophenyl, 2-cyano - 4,6 - dinitrophenyl, 2-trifluoromethyl-4-nitrophenyl, 2-chloro-6-cyano-4-nitrophenyl, 2-bromo-6-cyano-4-nitrophenyl, or 4-lower alkylsulfonylphenyl;

$R^1$ is lower alkanoyl, benzoyl, lower alkylsulfonyl, lower alkoxycarbonyl, or lower alkylcarbamoyl; and $R^5$ and $R^6$ each is hydrogen, methyl, methoxy or chlorine.

The compounds of group B wherein R is 2-chloro-4-nitrophenyl; 2-bromo-4-nitrophenyl, 2-chloro-4-lower alkylsulfonylphenyl, 2-bromo-4-lower alkylsulfonylphenyl, 2,4-di(lower alkylsulfonyl)phenyl, 2-lower alkylsulfonyl-4-nitrophenyl, or, especially, 2-cyano-4,6-dinitrophenyl exhibit exceptional fastness properties when applied to polyester fibers.

The novel azo compounds of the invention are prepared according to known procedures by diazotizing an amine having the formula R—NH₂ and coupling the resulting diazonium salt with a compound having the formula (II)
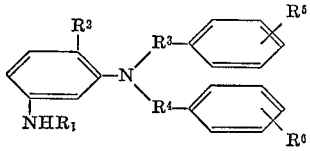

wherein

R, $R^1$, $R^2$, $R^3$, $R^4$, $R^5$ and $R^6$ are defined above. The amines R—NH₂ are known compounds and can be prepared by published techniques.

The coupler compounds of Formula II are prepared in accordance with analogous procedures described in the literature. The couplers can be prepared by reacting a compound having the formula (III)
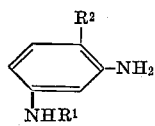

with a benzyl halide or an arylethyl halide. Couplers in which $R^3$ and $R^4$ and $R^4$ and $R^5$ are the same are obtained by reacting 2 equivalents of a benzyl halide or arylethyl halide with an amine of Formula II. The compounds of Formula II wherein $R^3$ and $R^4$ and/or $R^5$ and $R^6$ are different are prepared by reacting one equivalent of a benzyl halide or an arylethyl halide with amine (III) and then the resulting compound is reacted with a second benzyl halide or arylethyl halide. The above-described reactions are further illustrated by the following reactions:

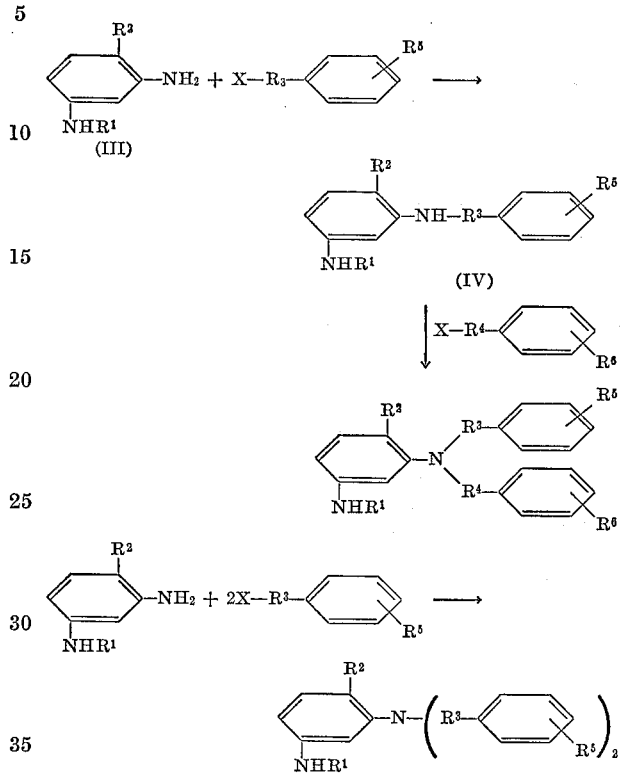

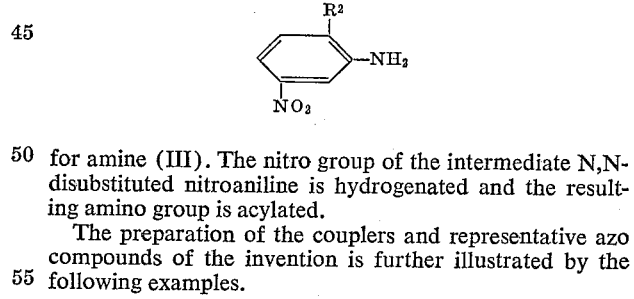

wherein X is halogen. The compounds of Formula IV can be prepared by condensing a benzaldehyde or arylacetaldehyde with amine III followed by hydrogenation of the resulting anil. The above-described synthesis of the couplers can be varied by substituting a nitroaniline having the formula for amine (III). The nitro group of the intermediate N,N-disubstituted nitroaniline is hydrogenated and the resulting amino group is acylated.

The preparation of the couplers and representative azo compounds of the invention is further illustrated by the following examples.

PREPARATION OF THE COUPLERS

Example 1

A mixture of 15.0 g. 3'-aminoacetanilide, 38.0 g. benzylchloride, and 25 ml. N,N - dimethylformamide are heated and stirred for 2 hr. at 95–105° C. Then 10.1 g. triethylamine is added, and the reaction is heated for another hour at 110–125° C. After drowning the reaction in water, the product, 3-acetamido-N,N-dibenzylaniline, is collected by filtration, washed with water, and air dried; M.P. 140–142° C.

Example 2

A mixture of 15.0 g. 3'-aminoacetanilide, 12.7 g. benzyl chloride, and 25 ml. N,N-dimethylformamide are heated for 12 minutes at 60–65° C. and then drowned in 350 ml. water. The product is collected by filtration and recrystallized from 250 ml. of benzene and 60 ml. of hexane. The product obtained, 3-acetamido-N-benzylaniline, melts at 129–130° C.

Example 3

A mixture of 18.0 g. 3′-nitroacetanilide, 2.0 g. sodium acetate, 31.8 g. benzaldehyde, 150 ml. ethanol, and 3 g. Raney nickel is hydrogenated at 75° C. and 1500 p.s.i. until the hydrogen uptake ceases. Ethanol (100 ml.) is added to the product from the autoclave. After heating to dissolve the product, the Raney nickel is removed by filtration. After removing most of the solvent by evaporation, the residue is poured into water. The product is collected by filtration, washed with water, and air dried. It melts at 128–130° C. and is identical to that prepared by the procedure of Example 2.

Example 4

3′-aminoacetanilide (15.0 g.), 2-phenylethylbromide (18.5 g.) and N,N-dimethylformamide (25 ml.) are heated at 80° C. for 1.25 hr. The reaction mixture is drowned into water. The slightly gummy product, 3-acetamido-N-(2-phenylethyl)aniline, is collected by filtration and air dried.

Example 5

A mixture of 3-acetamido - N - (2-phenylethyl)aniline (2.5 g.), benzylchloride (2.6 g.), and N,N-dimethylformamide (3.0 ml.) are heated at 95° C. for 0.5 hr. Triethylamine (2 g.) is added and the heating continued for 0.5 hr. The reaction is drowned into water. The product, 3-acetamido-N-benzyl - N - (2 - phenylethyl)aniline, is washed by decantation; it is a light amber viscous material.

Example 6

3′-aminoacetanilide (8.0 g.), α-chloro-p-xylene (21.0 g.), and 50 ml. N,N-dimethylformamide are heated at 95° C. for 1.5 hr. with stirring. Then 25 ml. of triethylamine is added and heating continued 7 hr. longer. The reaction mixture is drowned into water, and the product collected by filtration, washed with water, and air dried. The product, 3 - acetamido-N,N-(di-p-methylbenzyl)aniline, melts at 161–162° C.

Example 7

A mixture of 5-acetamido-2-methoxyaniline (18.0 g.), benzyl chloride (38.0 g.), and N,N-dimethylformamide are heated and stirred at 95° C. for 1 hr. Then triethylamine (26 ml.) is added, and the reaction is heated 2 hr. longer. After drowning in water, the product is collected by filtration and recrystallized from 250 ml. methanol plus a little water. The product, 5-acetamido-N,N-dibenzyl-2-methoxyaniline, melts at 138–139.5° C.

Example 8 m-Nitroaniline (69.0 g.), benzyl chloride (133.0 g.), and N,N-dimethylformamide (250 ml.) are heated at 130° C. for 6 hr. The reaction mixture is drowned in a hot water-methanol solution; the product crystallizes on stirring. After collection of the product by filtration, it is recrystallized from methanol to give 129 g. of yellow solid, N,N-dibenzyl-3-nitroaniline, which melts at 78–80° C. N,N-dibenzyl-3-nitroaniline (129 g.) is hydrogenated in 800 ml. of 2B-alcohol using Raney nickel catalyst (14.0 g.). The reaction is carried out at 75° C. and at 1500 p.s.i. and requires about 3 hr. The Raney nickel catalyst is then removed by filtration. Upon concentration of the filtrate to about one-third of the original volume, the product separates and is collected by filtration and dried in air. The yield is 103 g. of N,N-dibenzyl-m-phenylenediamine melting at 98–100° C.

Example 9

N,N-dibenzyl-m-phenylenediamine (14.4 g.), toluene (30.0 ml.), and propionic anhydride (5.0 ml.) are heated at 95–100° C. for 3 hr. with stirring. The reaction mixture is drowned with hexane, and the product is collected by filtration. It is recrystallized from a 3:1 benzene/hexane solution. The yield is 11.3 g. of N,N-dibenzyl-3-propionamidoaniline melting at 133–134° C.

Analysis.—Calcd. for $C_{23}H_{24}N_2O$ (percent): C, 80.2; H, 7.04; N, 8.13. Found (percent): C, 80.35; H, 6.97; N, 7.83.

Example 10

N,N-dibenzyl-m-phenylenediamine (8.64 g.), toluene (20.0 ml.) and formic acid (3.0 ml.) are heated at 95–100° C. for 4 hr., and then the reaction mixture is drowned in a water/methanol mixture. The product, N,N-dibenzyl-3-formamidoaniline, is collected by filtration; M.P. 95–98° C.

Analysis.—Calcd. for $C_{21}H_{20}N_2O$ (percent): C, 79.7; H, 6.38; N, 8.86. Found (percent): C, 79.9; H, 5.9; N, 8.73.

Example 11

To a solution of N,N-dibenzyl-m-phenylenediamine (5.76 g.) in dioxane (15 ml.) is added ethyl chloroformate (2.48 g.) and the solution is heated on steam bath for 30 min. The reaction mixture is poured slowly into 400 ml. hexane. The product, N,N-dibenzyl - 3 - ethoxyformamidoaniline, crystallizes on stirring and is collected by filtration.

Example 12

To a solution of 8.64 g. of N,N-dibenzyl-m-phenylenediamine in 20 ml. of pyridine is added 4.0 g. of methanesulfonyl chloride. After stirring at 95–100° C. for 2 hr., the reaction is drowned in 600 ml. of dilute HCl solution. The aqueous portion is decanted and the product recrystallized from ethanol to yield 3-methanesulfonamido-N,N-dibenzylaniline melting at 113–114° C.

Example 13

To a solution of N,N-dibenzyl-m-phenylenediamine (5.76 g.) in dioxane (15.0 ml.) is added p-toluenesulfonyl chloride (4.75 g.). The reaction is heated on a steam bath for 2 hr. and then is drowned in water. The product crystallizes and then is collected by filtration. After recrystallizing from methanol the product, 3-(p-toluenesulfonamido)-N,N-dibenzylaniline, melts at 134–135° C.

Example 14

To a solution of N,N-dibenzyl-m-phenylenediamine (8.64 g.) in toluene (20 ml.) is added ethyl isocyanate (2.12 g.). The reaction mixture is heated on a steam bath for 30 min. On cooling the product crystallizes and is collected by filtration. The product, N,N-dibenzyl-3-(3-ethylureido)aniline, is recrystallized from a methanol-water solution and melts at 154–157° C.

Analysis.—Calcd. for $C_{23}H_{25}N_3O$ (percent): C, 77.0; H, 6.76; N, 11.7. Found (percent): C, 77.0; H, 6.5; N, 11.6.

Example 15

To a solution of N,N-dibenzyl-m-phenylenediamine (8.64 g.) in 15 ml. of dioxane is added 2-furoyl chloride (4.3 g.). The reaction is heated with stirring on a steam bath for 15 min. and then is drowned in water. The aqueous portion is removed by decantation and the product is recrystallized from methanol. The product, N,N-dibenzyl-3-(2-furoylamido) aniline, melts at 145–148° C.

Analysis.—Calcd. for $C_{25}H_{22}N_2O_2$ (percent): C, 78.5; H, 5.8; N, 7.3. Found (percent): C, 78.3; H, 5.4; N, 6.9.

Example 16

3-cyclohexylformamidoaniline (109 g.), benzyl chloride (13.35 g.), and N,N-dimethylformamide (25 ml.) are heated at 130° C. for 4 hour. The reaction is then drowned in a methanolwater solution. The product, 3(1-cyclohexylformamido)N,N - dibenzylaniline crystallizes after stirring for a few minutes. It melts at 180–181° C.

Example 17

3′-aminobenzanilide (10.6 g.) is reacted with benzyl chloride (13.35 g.) exactly as in Example 16 to give 3-(benzamido)N,N-dibenzylaniline, which melt at 169–171° C.

Example 18

3'-aminoacetanilide (7.5 g.), p-chlorobenzyl chloride (24.2 g.), and N,N-dimethylformamide (25.0 ml.) are heated on a steam bath for 4 hr.; during this time 10 ml. of triethylamine is added portionwise. The reaction mixture is drowned in 600 ml. water plus 50 ml. of methanol. It is collected by filtration, dried in air, and recrystallized from a benzene-hexane solution. The yield is 19.7 g. of 3-acetamido-N,N-bis(p-chlorobenzyl)aniline which melts at 174–177° C.

Example 19

2-methoxy-5-acetamindoaniline (9.0 g.), N,N-dimethylformamide (15 ml.), and p-chlorobenzyl chloride (24.2 g.) are heated on a steam bath for 1 hr. Triethylamine (25 ml.) is added and the reaction heated 3 hr. longer. It is then drowned in water and recrystallized from a benzene-hexane solution. The yield is 20.8 g. of 5-acetamido--N,N-bis(p-chlorobenzyl)-2-methoxyaniline which melts at 153–158° C.

*Analysis.*—Calcd. for $C_{23}H_{22}Cl_2N_2O_2$ (percent): C, 64.4; H, 5.2; N, 6.5; Cl, 16.5. Found (percent): C, 64.4, H, 5.5; N, 6.4; Cl, 6.5.

Example 20

5-acetamido-2-methoxyaniline (9.0 g.), N,N-dimethylformamide (15 ml.), p-methylbenzylchloride (17.5 g.), and 25 ml. of triethylamine are reacted as illustrated by Example 19 to yield 5-acetamido-N,N-bis(p-methylbenzyl)-2-methoxyaniline which melts at 185–187° C.

Example 21

5-acetamino-2-methylaniline (16.4 g.), N,N-dimethylformamide (50.0 ml.), and benzylchloride (37.8 g.) are heated at 110° C. for 8 hrs. The product is collected by filtration, washed with water, and recrystallized from 200 ml. of methanol. The product, 5-acetamido-N,N-dibenzyl-2-methylaniline, melts at 181–182° C. 10.9.

*Analysis.*—Calcd. for $C_{23}H_{22}N_2O$ (percent): C, 75.3; H, 7.1; N, 11.0. Found (percent): C, 75.7; H, 7.0; N, 10.9.

PREPARATION OF THE AZO COMPOUNDS

Example 22

To 5 ml. conc. $H_2SO_4$ is added 0.72 g. of $NaNO_2$ with stirring. This solution is cooled and 10 ml. 1:5 acid (1 part propionic acid:5 parts acetic acid) is added below 10° C. This is stirred and 1.72 g. 2-chloro-4-nitroaniline is added followed by 10 ml. additional 1:5 acid, all at 0–5° C. The diazotization is stirred at 0–5° C. for 3 hr. and then added to a chilled solution of 3.30 g. 3-acetamido-N,N-dibenzylaniline dissolved in 100 ml. of 1:5 acid. The coupling is kept cold (below 5° C.) and buffered with solid ammonium acetate until neutral to Congo red paper. After allowing to couple for 2 hours., the product is drowned in water, collected by filtration, washed with water and dried in air. The azo compound produces bright red shades on polyester fibers and has the structure

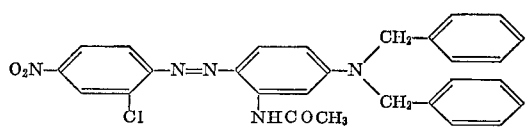

Example 23

2,4-bis(methylsulfonyl)aniline (2.49 g.) is diazotized and coupled to 3-acetamido-N,N-dibenzylaniline (3.30 g.) by using diazotization and coupling procedures given in Example 22 to yield the azo compound 4-(2,4-dimethylsulfonylphenylazo)-N,N - dibenzyl - 3 - acetamidoaniline. This compound produces brilliant red shades on polyester fibers.

Example 24

2 - methylsulfonyl - 4 - nitroaniline is diazotized and coupled with 3-acetamido-N,N-bis(p-methylbenzyl)aniline as described in Example 22 to yield the following dye 4-(2-methylsulfonyl-4-nitrophenylazo)-N,N - dibenzyl - 3-acetamidoaniline which imparts deep violet shades, having excellent fastness, to polyester fibers.

Example 25 p-Nitroaniline (6.9 g.) is dissolved in 5.54 ml. conc. $H_2SO_4$ and 12.6 ml. water. This solution is poured on 50 g. of crushed ice, and then a solution of 3.6 g. $NaNO$· in 8 ml. water is added all at once. The diazotization is stirred at 0–5° C. for 1 hr., and then the solution is added to a chilled solution of 3-acetamido-N,N-dibenzylaniline (16.5 g.) dissolved in 250 ml. of 1:5 acid. The coupling is kept at 0–5° C. and neutralized with ammonium acetate until it is neutral to Congo red paper. After coupling 2 hrs., the mixture is drowned in water. The product is collected by filtration, washed with water, and air dried. It has the following structure:

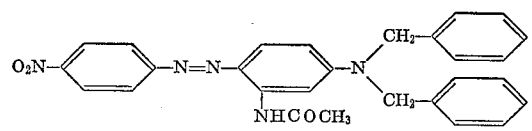

This compound produces bright scarlet shades on polyester fibers.

The azo compounds described in the examples of the following tables are prepared by the procedures described in Examples 22 and 25 by diazotizing 0.01 mole of an amine having the formula

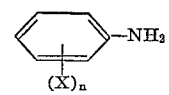

wherein Y is a substituent and $n$ is 1, 2 or 3, and coupling the resulting diazonium with 0.01 mole of a compound of Formula II. The azo compounds of the table conform to Formula I in which R corresponds to the phenyl group of the above amine. The color given for each of the compounds refers to dyeings on polyester fibers.

TABLE

| Ex. No. | (Y) | R¹ | R² | R³ | R⁴ | R⁵ | R⁶ | Color |
|---|---|---|---|---|---|---|---|---|
| 26 | 2-Cl—4-NO₂ | —COOC₂H₅ | H | —CH₂— | —CH₂— | H | H | Red. |
| 27 | 2-Cl—4-NO₂ | —SO₂CH₃ | H | —CH₂— | —CH₂— | H | H | Red. |
| 28 | 2-Cl—4-NO₂ | —COC₆H₅ | H | —CH₂— | —CH₂— | H | H | Red. |
| 29 | 2-Cl—4-NO₂ | —SO₂C₆H₅ | H | —CH₂— | —CH₂— | H | H | Red. |
| 30 | 2-Cl—4-NO₂ | —COC₆H₁₁ | H | —CH₂— | —CH₂— | H | H | Red. |
| 31 | 2-Cl—4-NO₂ | —CONHC₂H₅ | H | —CH₂— | —CH₂— | H | H | Red. |
| 32 | 2-Cl—4-NO₂ | —CONHC₆H₅ | H | —CH₂— | —CH₂— | H | H | Red. |
| 33 | 2-Cl—4-NO₂ | —COCH₃ | H | —CH₂CH₂— | —CH₂CH₂— | H | H | Red. |
| 34 | 2-Cl—4-NO₂ | —COCH₃ | H | —CH₂— | —CH₂— | 4-CH₃ | H | Red. |
| 35 | 2-Cl—4-NO₂ | —COCH₃ | H | —CH₂— | —CH₂— | 4-CH₃ | 4-CH₃ | Red. |
| 36 | 2-Br—4-NO₂ | —COCH₃ | H | —CH₂— | —CH₂— | —H | 4-OCH₃ | Red. |
| 37 | 2-Cl—4-NO₂ | —COCH₃ | H | —CH₂— | —CH₂— | —H | 4-Cl | Red. |
| 38 | 2-Cl—4-NO₂ | —COCH₃ | —CH₃ | —CH₂— | —CH₂— | —H | —H | Red. |
| 39 | 2-Cl—4-NO₂ | —SO₂CH₃ | —H | —CH₂— | —CH₂— | 4-Cl | 4-Cl | Scarlet. |
| 40 | 2-Cl—4-NO₂ | —COCH₃ | —Cl | —CH₂— | —CH₂— | —H | —H | Do. |

3,763,141

TABLE—Continued

| Ex. No. | (Y) | R¹ | R² | R³ | R⁴ | R⁵ | R⁶ | Color |
|---|---|---|---|---|---|---|---|---|
| 41 | 2-Cl—4-NO₂ | —COCH₃ | —OCH₃ | —CH₂— | —CH₂— | —H | —H | Red. |
| 42 | 4-NO₂— | —COCH₃ | H | —CH₂— | —CH₂— | 4-CH₃ | 3-CH₃ | Scarlet. |
| 43 | 4-NO₂— | —COCH₃ | H | —CH₂— | —CH₂— | 4-Cl | 4-Cl | Do. |
| 44 | 4-NO₂— | —COCH₃ | H | —CH₂— | —CH₂— | —H | 3-Cl | Do. |
| 45 | 4-NO₂— | —COOC₂H₅ | H | —CH₂— | —CH₂— | —H | 3-Cl | Do. |
| 46 | 4-NO₂— | —COOC₂H₅ | H | —CH₂— | —CH₂— | —H | H | Do. |
| 47 | 2-CN—4-NO₂ | —COOC₂H₅ | H | —CH₂— | —CH₂— | —H | H | Violet. |
| 48 | 2-CN—4-NO₂ | —COCH₃ | H | —CH₂— | —CH₂— | —H | H | Do. |
| 49 | 2-CN—4-NO₂ | —COC₂H₅ | H | —CH₂— | —CH₂— | —H | H | Do. |
| 50 | 2-CN—4-NO₂ | —COC₃H₇(n) | H | —CH₂— | —CH₂— | —H | H | Do. |
| 51 | 2-CN—4,6-di-NO₂ | —COCH₃ | H | —CH₂— | —CH₂— | —H | H | Red-blue. |
| 52 | 2-CN—4,6-di-NO₂ | —COCH₃ | —CH₃ | —CH₂— | —CH₂— | —H | H | Blue. |
| 53 | 2-CN—4,6-di-NO₂ | —COCH₃ | —OC₂H₅ | —CH₂— | —CH₂— | —H | H | Do. |
| 54 | 2-CN—4,6-di-NO₂ | —COCH₃ | —OC₂H₅ | —CH₂— | —CH₂— | —H | H | Do. |
| 55 | 2-CN—4,6-di-NO₂ | —COCH₃ | —OC₂H₅ | —OC₂— | —CH₂— | 4-CH₃ | 4-CH₃ | Do. |
| 56 | 2-Cl—4,6-di-NO₂ | —COCH₃ | —OCH₃ | —CH₂CH₂— | —CH₂— | 4-CH₃ | 4-CH₃ | Do. |
| 57 | 2-Cl—4,6-di-NO₂ | —COCH₃ | —OCH₃ | —CH₂CH₂— | —CH₂CH₂— | 4-CH₃ | 4-CH₃ | Do. |
| 58 | 2-Cl—4,6-di-NO₂ | —COCH₃ | —OCH₃ | —CH₂— | —CH₂— | 4-CH₃ | 4-OCH₃ | Do. |
| 59 | 2-Cl—4,6-di-NO₂ | —COCH₃ | —CH₃ | —CH₂— | —CH₂— | 4-CH₃ | 4-CH₃ | Do. |
| 60 | 2-Cl—4,6-di-NO₂ | —COCH₃ | —OH₃ | —CH₂— | —CH₂— | 2-OH | 4-CH₃ | Do. |
| 61 | 2Cl—4,6-di-NO₃ | —COCH₃ | —CH₃ | —CH₂— | —CH₂— | —H | —H | Do. |
| 62 | 2-Cl—4,6-di-NO₂ | —COCH₃ | —OCH₃ | —CH₂— | —CH₂— | —H | —H | Do. |
| 63 | 2-Cl—4,6-di-NO₂ | —COCH]OH | —OCH₃ | —CH₂— | —CH₂— | —H | —H | Do. |
| 64 | 2-Cl—4,6-di-NO₂ | —COOC₂H₅ | —OCH₃ | —CH₂— | —CH₂— | —H— | —H | Do. |
| 65 | 2-Br—4,6-di-NO₂ | —COCH₂O≈H₃ | —OCH₃ | —CH₂— | —CH₂— | —H | —H | Do. |
| 66 | 2-Gr—4,6-di-NO₂ | —OOCH₂CN | —OCH₃ | —OH: | —CH₂— | —H | —H | Do. |
| 67 | 2-Cl—4-SO₂CH₃ | —COCH₃ | —OCH₃ | —CH₂— | —CH₂— | —H | —H | Red. |
| 68 | 2-Cl—4-SO₂CH₃ | —COCH₃ | —H | —HH₂— | —CH₂— | —H | —H | Scarlet. |
| 69 | 2-Cl—4-SO₂CH₃ | —COCH₃ | —H | —CH₂— | —CH₂— | 4-CH₃ | 4-CH₃ | Do. |
| 70 | 2-Br—4-SO₂C₂H₅ | —COCH₃ | —H₂ | —CH₂— | —CH₂— | H | H | Do. |
| 71 | 2-Cl—4-SO₂CH₃ | —COOC₂H₅ | —H | —CH₂— | —CH₂— | H | H | Do. |
| 72 | 4-SO₂CH₃ | —COOC₂H₅ | —H | —CH₂— | —CH₂— | H | H | Orange. |
| 73 | 4-SO₂CH₃ | —COCC₃ | —H | —CH₂— | —CH₂— | H | H | Do. |
| 74 | 4-SO₂≈₃H¹ | —COCH₃ | —H | —CH₂— | —CH₂— | 2-Cl | H | Do. |
| 75 | 2,4-di-SO₂CH₃ | —COCH₃ | —H | —CH₂— | —CH₂— | 4-CH₃ | 4-CH₃ | Red. |
| 76 | 2,4-di-SO₂CH₃ | —COO≈]H₅ | —H | —CH₂— | —CH₂— | —H | —H | Red. |
| 77 | 2,4-di-SO₂C₂H₅ | —COC₆H₅ | —H | —CH₂— | —CH₂— | —H | —H | Red. |
| 78 | 2,4-di-SO₂CH₃ | —CONH=₂H₅ | —H | —CH₂— | —CH₂— | —H | —H | Red. |
| 79 | 2,4-di-SO₂CH₃ | —CO≈H₃ | —OCH₃ | —CH₂— | —CH₂— | —H | —H | Violet. |
| 80 | 2-CO₂CH₃—4-NO₂ | —CO≈H₃ | —H | —CH₂— | —CH₂— | —H | —H | Do. |
| 81 | 2-CO₂CH₃—4-NO₂ | —CO≈H₃ | —H | —CH₂— | —CH₂— | 3-CH₃ | —H | Do. |
| 82 | 2-CO₂CH₃—4-NO₂ | —COOC₂H₅ | —H | —CH₂— | —CH₂— | 3-CH₃ | —H | Do. |
| 83 | 4-CO₂NH₂ | —COO≈₂H₅ | —H | —CH₂— | —CH₂— | 3-CH₃ | —H | Orange. |
| 84 | 4-COOC₂H₅ | —COOC₂H₅ | —H | —CH₂— | —CH₂— | 3-CH₃ | —H | Do. |
| 85 | 4-CN | —COO=₂H₅ | —H | —CH₂— | —CH₂— | 3-CH₃ | —H | Do. |
| 86 | 4-CN | —OC≈H₃ | —H | —CH₂— | —CH₂— | 3-CH₃ | —H | Do. |
| 87 | 2,4-di-CN | —OC≈H₃ | —H | —CH₂— | —CH₂— | 3-CH₃ | —H | Red. |
| 88 | 2,4-di-CN | —OC≈H₃ | —H | —CH₂— | —CH₂— | 4-OCH₃ | —H | Red. |
| 89 | 2,4-di-CN | —SO₂—C₆H₄-p-CH₃ | —H | —CH₂— | —CH₂— | —H | —H | Red. |
| 90 | 2,4-di-CN | —CO—C₆H₄-p-CH₃ | —H | —CH₂— | —CH₂— | —H | —H | Red. |
| 91 | 2-Cl—4-COOC₂H₅ | —COCH₃ | —H | —CH₂— | —CH₂— | —H | —H | Red. |
| 92 | 2-Cl—4-CN | —COCH₃ | —H | —CH₂— | —CH₂— | —H | —H | Red. |
| 93 | 4-CHO | —COCH₃ | —H | —CH₂— | —CH₂— | —H | —H | Orange. |
| 94 | 4-COCH₃ | —COCH₃ | —H | —CH₂— | —CH₂— | —H | —H | Do. |
| 95 | 2-Cl—4-COCH₃ | —COCH₃ | —H | —CH₂— | —CH₂— | —H | —H | Red. |
| 96 | 4-CF₃ | —COCH₃ | —H | —CH₂— | —CH₂— | —H | —H | Orange. |
| 97 | 2-CF₃—4-NO₂ | —COCH₃ | —H | —CH₂— | —CH₂— | —H | —H | Red. |
| 98 | 2-COOCH₃—4-NO₂ | —COCH₃ | —H | —CH₂— | —CH₂— | —H | —H | Red. |
| 99 | 3,5-di-COOCH₃ | —COCH₃ | —H | —CH₂— | —CH₂— | —H | —H | Orange. |
| 100 | 2-NO₂—4-SCN | —COCH₃ | —H | —CH₂— | —CH₂— | —H | —H | Red. |
| 101 | 2-NO₂—4-SCN | —SO₂—C₆H₄—p-CH₃ | —H | —CH₂— | —CH₂— | —H | —H | Red. |
| 102 | 2-NO₂—4-SCN | —COCH₃ | —OCH₃ | —CH₂CH₂— | —CH₂—CH₂— | —H | —H | Red. |
| 103 | 2-Cl—4-NO₂—6-CN | —COCH₃ | —OCH₃ | —CH₂— | —CH₂— | —H | —H | Reddish-blue. |
| 104 | 2-Br—6-CN—4-NO₂ | —COCH₃ | H | —CH₂— | —CH₂— | —H | —H | Do. |
| 105 | 4-Cl | —COCH₃ | —H | —CH₂— | —CH₂— | —H | —H | Yellow. |
| 106 | 2-COOCH₃—4-NO₂ | —COCH₃ | —H | —CH₂— | —CH₂— | —H | —H | Red. |
| 107 | 2-COCH₃—4,6-di-Br | —COCH₃ | —H | —CH₂— | —CH₂— | —H | —H | Red. |
| 108 | 2-CONH₂—4-NO₂ | —COCH₃ | —H | —CH₂— | —CH₂— | —H | —H | Violet. |
| 109 | 2-Cl—4-NO₂ | —CO₂H₅ | H | —CH₂— | —CH₂— | H | H | Red. |
| 110 | 2-Cl—4-NO₂ | —CHO | H | —CH₂— | —CH₂— | H | H | Red. |
| 111 | 2-Cl—4-NO₂ | —SO₂C₂H₄Cl | H | —CH₂— | —CH₂— | H | H | Scarlet. |
| 112 | 2-Cl—4-NO₂ | —COC₂H₄OH | H | —CH₂— | —CH₂— | H | H | Red. |
| 113 | 2-Cl—4-NO₂ | —COCH₂Cl | H | —CH₂— | —CH₂— | H | H | Red. |
| 114 | 2-Cl—4-NO₂ | —COCH₂C₆H₅ | H | —CH₂— | —CH₂— | H | H | Red. |
| 115 | 2-Cl—4-NO₂ | 2-furoyl | H | —CH₂— | —CH₂— | H | H | Red. |
| 116 | 2-Cl—4-NO₂ | —CO—C₆H₄—p-CH₃ | H | —CH₂ | —CH₂— | H | H | Red. |
| 117 | 2-Cl—4-NO₂ | —CO—C₆H₄—p—CH₃ | H | —CH₂— | —CH₂— | H | H | Red. |
| 118 | 2-Cl—4-NO₂ | —CO—C₆H₅ (O double bond) | H | —CH₂— | —CH₂— | H | H | Red. |
| 119 | 2-Cl—4-NO₂ | —COCH(CH₃)₂ | H | —CH₂— | —CH₂— | H | H | Red. |
| 120 | 2-Cl—4-NO₂ | —COCH₃ | H | —CH₂— | —CH₂— | 4-Cl | 4-Cl | Scarlet. |
| 121 | 2-Cl—4-NO₂ | —COCO₃ | H | —CH₂— | —CH₂— | 4-Cl | H | Red. |
| 122 | 2-CN—4-NO₂ | —COCH₃ | —OCH₃ | —CH₂— | —CH₂— | —H | —H | Blue. |
| 123 | 2-CN—4-NO₂ | —COCH₃ | —OCH₃ | —CH₂— | —CH₂— | 4-OCH₂— | —H | Do. |
| 124 | 2-CN—4-NO₂ | —COCH₃ | —OCH₃ | —CH₂— | —CH₂— | 4-Cl | —H | Do. |
| 125 | 2-Cl—4,6-di-NO₂ | —COCH₃ | —OCH₃ | —CH₂— | —CH₂— | 4-Cl | —H | Do. |
| 126 | 2-Cl—4,6-di-NO₂ | —COCH₃ | —OCH₃ | —CH₂— | —CH₂— | 4-Cl | 4-Cl | Do. |
| 127 | 2-Cl—4,6-di-NO₂ | —COCH₃ | —OCH₃ | —CH₂— | —CH₂— | 4-Br | —H | Do. |
| 128 | 2-Cl—4,6-di-NO₂ | —COCH₃ | —OCH₃ | —CH₂— | —CH₂— | 2-CH₃ | —H | Do. |
| 129 | 2-Cl—4,6-di-NO₂ | —COCH₃ | —OCH₃ | —CH₂— | —CH₂— | 3-CH₂ | —H | Do. |
| 130 | 2-Cl—4,6-di-NO₂ | —COCH₃ | —OCH₃ | —CH₂— | —CH₂— | 4-OCH₃ | 4-OCH₃ | Do. |
| 131 | 2-Cl—4,6-di-NO₂ | —COCH₃ | —OCH₃ | —CH₂— | —CH₂— | H | 4-OCH₃ | Do. |
| 132 | 2-Cl—4,6-di-NO₂ | —COCH₃ | —OCH₃ | —CH₂— | —CH₂— | 3-CH₃ | 3-CH₃ | Do. |
| 133 | 2-Cl—4,6-di-NO₂ | —COCH₃ | —OCH₃ | —CH₂— | —CH₂— | 3-CH₃ | 4-OCH₃ | Do. |
| 134 | 2-Cl—4,6-di-NO₂ | —COCH₃ | —OC₂H₅ | —CH₂— | —CH₂— | —H | —H | Do. |
| 135 | 2-Cl—4,6-di-NO₂ | —COCH₃ | —OCH₃ | —CH₂— | —CH₂— | —H | —H | Do. |
| 136 | 2-Cl—4,6-di-NO₂ | —COCH₃ | —OC₄H₉(n) | —CH₂— | —CH₂— | —H | —H | Do. |
| 137 | 2-Cl—4,6-di-NO₂ | —COCH₃ | —OCH₃ | —CH₂— | —CH₂— | 4-OH | —H | Do. |
| 138 | 2-Cl—4,6-di-NO₂ | —COCH₃ | —OCH₃ | —CH₂— | —CH₂— | 2-OH | —H | Do. |
| 139 | 2-Br—4,6-di-NO₂ | —COCH₃ | —OCH₃ | —CH₂— | —CH₂— | —H | —H | Do. |
| 140 | 2-Br—4,6-di-NO₂ | —COCH₃ | —OCH₃ | —CH₂— | —CH₂— | 4-OCH₃ | —H | Do. |
| 141 | 2-Br—4,6-di-NO₂ | —COCH₃ | —OCH₃ | —CH₂— | —CH₂— | 4-OCH₃ | 4-CH₃ | Do. |
| 142 | 2-Br—4,6-di-NO₂ | —COCH₃ | —OCH₃ | —CH₂— | —CH₂— | 4-OCH₃ | 4-Cl | Do. |
| 143 | 2-Br—4,6-di-NO₂ | —COCH₃ | —OCH₃ | —CH₂— | —CH₂— | 4-OCH₃ | 4-OCH₃ | Do. |

TABLE—Continued

| Ex. No. | (Y) | R¹ | R² | R³ | R⁴ | R⁵ | R⁶ | Color |
|---|---|---|---|---|---|---|---|---|
| 144 | 2-Cl—6-CN-4-NO₂ | —COCH₃ | —OCH₃ | —CH₂— | —CH₂— | 4-OCH₃ | 4-OCH₃ | Blue. |
| 145 | 2-Cl—6-CN-4-NO₂ | —COCH₃ | —OCH₃ | —CH₂— | —CH₂— | —H | 4-CH₃ | Do. |
| 146 | 2-Cl—6-CN-4-NO₂ | —COCH₃ | —OCH₃ | —CH₂— | —CH₂— | —H | 3-CH₃ | Do. |
| 147 | 2-Cl—6-CN-4-NO₂ | —COCH₃ | —OCH₃ | —CH₂— | —CH₂— | —H | 2-CH₃ | Do. |
| 148 | 2,4-di-NO₂—6-SO₂CH₃ | —COCH₃ | —OCH₃ | —CH₂— | —CH₂— | —H | 2-CH₃ | Do. |
| 149 | 2,4-di-NO₂—6-SO₂CH₃ | —COCH₃ | —COH₃ | —CH₂— | —CH₂— | —H | —H | Do. |
| 150 | 2,4-di-NO₂—6-SO₂CH₃ | —COCH₃ | —OCH₃ | —CH₂— | —CH₂— | —H | 4-OCH₃ | Do. |
| 151 | 2,4-di-NO₂—6-SO₂CH₃ | —COCH₃ | —OCH₃ | —CH₂— | —CH₂— | —H | 4-CH₃ | Do. |
| 152 | 2,4-di-NO₂—6-SO₂CH₃ | —COCH₃ | —OCH₃ | —CH₂— | —CH₂— | —H | 4-Cl | Do. |
| 153 | 2,4-di-NO₂—6-SO₂NHC]H₅ | —COCH₃ | —OCH₃ | —CH₂— | —CH₂— | —H | 4-Cl | Do. |
| 154 | 2,4-di-NO₂—6-SO₂NHC₂H₅ | —COCH₂ | —OCH₃ | —CH₂— | —CH₂— | —H | 4-Cl | Do. |
| 155 | 2,4-di-NO₂—6-SO₂NHC₂H₅ | —COCH₃ | —OCH₃ | —CH₂— | —CH₂— | —H | 4-CH₃ | Do. |
| 156 | 2-COCH₃—4,6-di-NO₂ | —COCH₃ | —OCH₃ | —CH₂— | —CH₂— | —H | 4-CH₃ | Do. |
| 157 | 2-COCH₃—4,6-di-NO₂ | —COCH₃ | —OCH₃ | —CH₂— | —CH₂— | —H | —H | Do. |
| 158 | 2-COCHO₂—4,6-di-NO₂ | —COCH₃ | —OCH₃ | —CH₂— | —CH₂— | —H | —H | Do. |
| 159 | 2-COOCH₂—4,6-di-NO₂ | —COCH₃ | —OCH₃ | —CH₂— | —CH₂— | —H | —OCH₃ | Do. |
| 160 | 2-CF₃—4,6-di-NO₂ | —COCH₃ | —OCH₃ | —CH₂— | —CH₂— | —H | —OCH₃ | Do. |

The compounds of the invention can be used for dyeing linear polyester textile materials in the manner described in U.S. Pats. 2,880,050, 2,757,064, 2,782,187 and 3,043,827. The following example illustrates a carrier dyeing procedure for applying the azo compounds of the invention to dye polyester textile materials.

Example 161

An amount of 0.1 g. of the azo compound is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of an anionic solvent carrier (Tanavol) is added to the bath and 10 grams of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 250° F. and heat set (for the removal of residual carrier) for 5 minutes at 350° C.

The compounds of the invention can also be applied to polyester textile materials by the heat fixation technique described in U.S. Pat. 2,663,612 and in the American Dyestuff Reporter, 42, 1 (1953). The following procedure describes how the azo compounds of the invention be applied to polyester materials by the heat fixation technique.

Example 162

A mixture of: 500 mg. of the compound of Example 22, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a micro-size container (an accessory for a 1-quart size Szegvari Attritor) for approxmiately 3.5 hours. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring.

A thickener and penetrating mixture is prepared by mixing 1 ml. of a complex diaryl sulfonate surfactant, (compound 8–S), 3 ml. of a 3% solution of a sodium N-methyl-N-oleoyltaurate (Igepon T-S1), 8 ml. of a 25% solution of natural gums (Superclear 80–N), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the resevoir of a Butterworth padder where it is heated to about 45–60° C.

10 g. of a fabric of poly(ethylene terephthalate) fibers and 10 g. of a fabric of 65/35 spun poly(ethylene terephthalate)/cotton fibers are sewn together, end-to-end, and padded for 5 minutes of continuous cycling through the dye mixture and between three rubber squeeze rollers of the padder. Dye mixture pick-up is about 60% based on the weight of the fabrics.

The padded fabrics are then dried at 200° F. and then heat-fixed for 2 minutes at 415° F. in a forced air oven. The dyed fabrics are scoured for 20 minutes at 65–70° C. in a solution containing 0.2% sodium hydrosulfite, 0.2% sodium carbonate and 1.7% of a 3% solution of sodium N-methyl-N-oleoyltaurate and then dried. The dyed fabrics possess excellent brightness and exhibit outstanding fastness to light and sublimation when tested according to the procedures described in the 1966 edition of the Technical Manual of the American Association of Textile Chemists and Colorists.

The heat fixation dyeing procedure described above can be varied by the substitution of other dispersing agents, surfactants, suspending agents, thickeners, etc. The temperature and time of the heat-fixation step can also be varied.

Polymeric linear polyester materials of the terephthalate sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylmethylterephthalate. Polyesters prepared from cyclohexanedimethanol and dimethylterephthalate are more particularly described in U.S. Pat. 2,901,446. Poly(ethylene terephthalate) polyester fibers are described, for example, in U.S. Pat. 2,465,319. The polymeric linear polyester materials disclosed in U.S. Pats. 2,945,010, 2,957,745, and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These inherent viscosities are measured at 25° C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc.

The invention has been described in considerable detail with particular reference to preferred embodiments thereof, but it will be understood that variations and modifications can be effected within the spirit and scope of the invention as described hereinabove and as defined in the appended claims.

We claim:
1. A compound having the formula

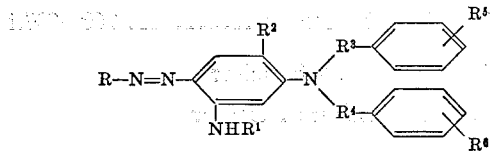

wherein

R is phenyl substituted with 1, 2 or 3 groups selected from the class consisting of nitro, chlorine, bromine, lower alkylsulfonyl, lower cyanoalkylsulfonyl, lower hydroxyalkylsulfonyl, lower chloroalkylsufonyl, lower bromoalkylsulfonyl, formyl, lower alkanoyl, lower cyanoalkanoyl, lower alkoxy-lower-alkanoyl, lower hydroxyalkanoyl, lower alkylsulfonyl-lower-alkanoyl, lower alkoxycarbonyl, cyano, trifluoromethyl, sulfamoyl, lower alkylsulfamoyl, di-lower alkylsulfamoyl carbamoyl di-lower alkylcarbamoyl or thiocyanato;

$R^1$ is formyl, lower alkanoyl, lower cyanoalkanoyl, lower alkoxy-lower-alkanoyl, lower hydroxyalkanoyl, lower alkylsulfonyl-lower-alkanoyl, lower phenylalkanoyl, benzoyl, lower alkylbenzoyl, lower alkoxybenzoyl, chlorobenzoyl, bromobenzoyl, cyclohexylcarbonyl, lower alkoxycarbonyl, phenoxycarbonyl, lower alkylphenoxycarbonyl, lower alkoxyphenoxycarbonyl, chlorophenoxycarbonyl, bromophenoxycarbonyl, lower alkylsulfonyl, lower cyanoalkylsulfonyl, lower hydroxyalkylsulfonly, lower chloroalkylsulfonyl, bromoalkylsulfonyl, phenylsulfonyl, lower alkylphenylsulfonyl, lower alkoxyphenylsulfonyl, chlorophenylsulfonyl, bromophenylsulfonyl, carbamoyl, lower alkylcarbamoyl di-lower alkylcarbamoyl, phenylcarbamoyl, lower alkylphenylcarbamoyl, lower alkoxyphenylcarbamoyl, chlorophenylcarbamoyl, or bromophenylcarbamoyl;

$R^2$ is hydrogen, lower alkyl or lower alkoxy;

$R^3$ and $R^4$ are the same or different and each is alkylene of about 1 to 2 carbon atoms; and $R^5$ and $R^6$ are the same or different and each is hydrogen, lower alkyl, lower alkoxy, chlorine, or bromine.

2. A compound according to claim 1 wherein
R is phenyl substituted with 1, 2 or 3 groups selected from the class consisting of nitro, chlorine, bromine, lower alkylsulfonyl, cyano, thiocyanato, trifluoromethyl, lower alkanoyl, formyl, or lower alkoxycarbonyl; and
$R^1$ is formyl, lower alkanoyl, benzoyl, lower alkylbenzoyl, lower alkoxycarbonyl, lower alkylsulfonyl, phenylsulfonyl, lower alkylphenylsulfonyl, carbamoyl, lower alkylcarbamoyl, or phenylcarbamoyl.

3. A compound according to claim 1 having the formula

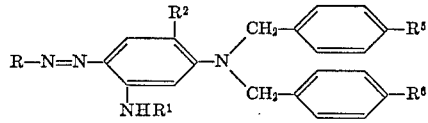

wherein

R is 2-chloro-4,6-dinitrophenyl, 2-bromo-4,6-dinitrophenyl, 2-formyl-4,6-dinitrophenyl, 2-lower alkanoyl-4,6-dinitrophenyl, 2-lower alkoxycarbonyl-4,6-dinitrophenyl, or 2-trifluoro-4,6-dinitrophenyl;
$R^1$ is lower alkanoyl, benzoyl, lower alkylsulfonyl, lower alkoxycarbonyl, or lower alkylcarbamoyl;
$R^2$ is methoxy or ethoxy; and
$R^5$ and $R^6$ are the same or different and each is hydrogen, methyl, methoxy, or chlorine.

4. A compound according to claim 1 having the formula

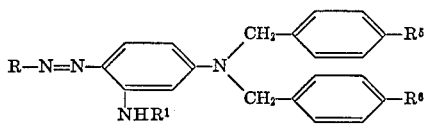

wherein

R is 2-chloro-4-nitrophenyl, 2-bromo-4-nitrophenyl, 4-nitrophenyl, 2-chloro-4-lower alkylsulfonylphenyl, 2-bromo-4-lower alkylsulfonylphenyl, 2,4-di-lower alkylsulfonylphenyl, 2-lower alkylsulfonyl-4-nitrophenyl, 2-lower alkylsulfonyl-4-thiocyanatophenyl, 2-cyano-4,6-dinitrophenyl, 2-trifluoromethyl-4-nitrophenyl, 2-chloro-6-cyano - 4 - nitrophenyl, 2-bromo-6-cyano-4-nitrophenyl, or 4-lower alkylsulfonylphenyl;

$R^1$ is lower alkanoyl, benzoyl, lower alkylsulfonyl, lower alkoxycarbonyl, or lower alkylcarbamoyl; and $R^5$ and $R^6$ are the same or different and each is hydrogen, methyl, methoxy, or chlorine.

5. A compound according to claim 4 wherein R is 2-chloro-4-nitrophenyl, 2-bromo-4-nitrophenyl, 2-chloro-4-lower alkylsulfonyl, 2-bromo-4-lower alkylsulfonylphenyl, 2,4-di-lower alkylsulfonylphenyl, 2-lower alkylsulfonyl-4-nitrophenyl, or 2-cyano-4,6-dinitrophenyl.

6. A compound according to claim 1 having the formula

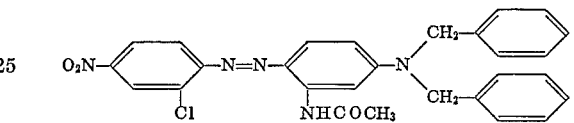

7. A compound according to claim 1 having the formula

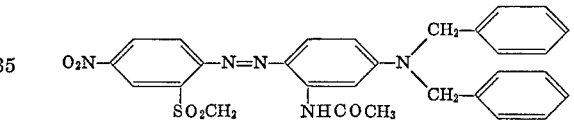

8. A compound according to claim 1 having the formula

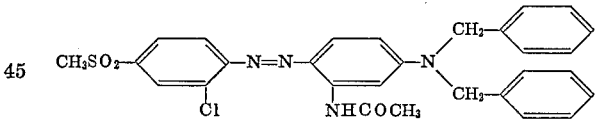

9. A compound according to claim 1 having the formula

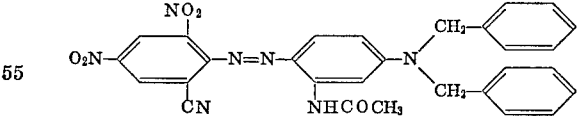

10. A compound according to claim 1 having the formula

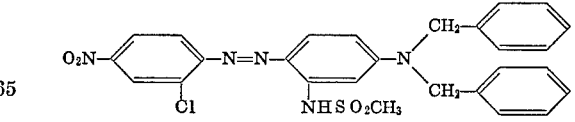

11. A compound according to claim 1 having the formula

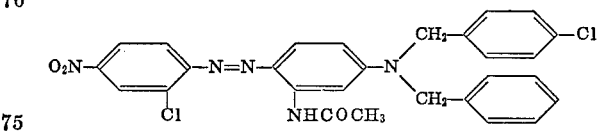

12. A compound according to claim 1 having the formula
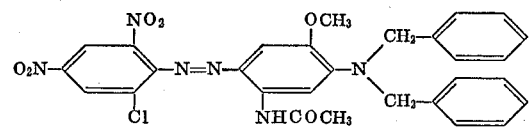
13. A compound having the formula
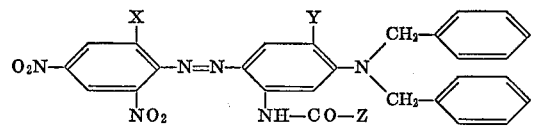
wherein X is Cl or Br; Y is methoxy or ethoxy; and Z is lower alkyl.
References Cited
FOREIGN PATENTS
779,291   2/1968   Canada _____ 260—207.1
LEWIS GOTTS, Primary Examiner
C. F. WARREN, Assistant Examiner
U.S. Cl. X.R.
8—41 C; 260— 152, 207.1, 347.3, 465 D, 465 E, 471 C, 553 A, 553 R, 556 A, 556 AR, 558 D, 558 P, 559 R, 562 S, 562 P

UNITED STATES PATENT OFFICE
CERTIFICATE OF CORRECTION

Patent No. 3,763,141     Dated October 2, 1973

Inventor(s) Max A. Weaver and Herman S. Pridgen

It is certified that error appears in the above-identified patent and that said Letters Patent are hereby corrected as shown below:

Column 3, lines 50-55, delete the formula and insert

--- (II) 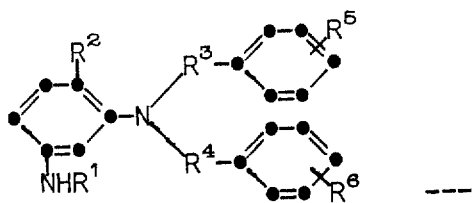 ---

Column 4, lines 26-31, delete the portion of the formula appearing therein, and insert --- 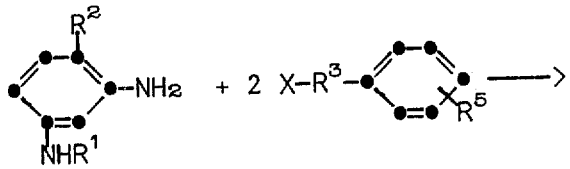 ---

Column 6, line 64, delete "(109 g.)" and insert ---(10.9 g.)---.

Column 6, line 67, delete "methanolwater" and insert ---methanol-water---.

Column 7, line 13, delete "2-methoxy-5-acetamindoaniline" and insert ---2-methoxy-5-acetamidoaniline---.

Column 7, line 39, delete "10.9."

Column 8, line 25, delete "5.54 ml." and insert ---5.4 ml.---.

Column 8, line 27, delete "NaNO" and insert ---$NaNO_2$---.

Column 8, lines 50-54, delete the formula and insert

UNITED STATES PATENT OFFICE
CERTIFICATE OF CORRECTION

Patent No. 3,763,141   Dated October 2, 1973

Inventor(s) Max A. Weaver and Herman S. Pridgen

It is certified that error appears in the above-identified patent and that said Letters Patent are hereby corrected as shown below:

- 2 -

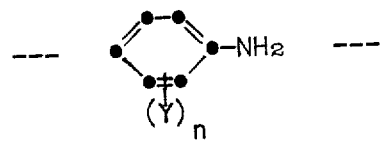

Columns 7, 9, and 11, in the heading of the Table, delete "(Y)" and insert ---$(Y)_n$---.

Columns 9 and 10, in the Table, Example 55, under the heading "$R^3$", delete "-$OC_2$-" and insert --- -$CH_2$- ---.

Columns 9 and 10, in the Table, Example 60, under the heading "$R^2$", delete "-$OH_3$" and insert --- -$CH_3$---.

Columns 9 and 10, in the Table, Example 61, under the heading "$(Y)_n$", delete "2Cl-4,6-di-$NO_3$" and insert ---2-Cl-4,6-di-$NO_2$---.

Columns 9 and 10, in the Table, Example 63, under the heading "$(Y)_n$", delete "2-Cl-4,6-di-NO]" and insert ---2-Cl-4,6-di-$NO_2$---.

Columns 9 and 10, in the Table, Example 63, under the heading "$R^1$", delete "-COCH]OH" and insert --- -$COCH_2$OH---.

Columns 9 and 10, in the Table, Example 65, under the heading "$R^1$", delete "-$COCH_2$O⋿$H_3$" and insert --- -$COCH_2OCH_3$---.

Columns 9 and 10, in the Table, Example 66, under the heading "$(Y)_n$", delete "2-Gr-4,6-di-$NO_2$" and insert ---2-Br-4,6-di-$NO_2$---.

Columns 9 and 10, in the Table, Example 66, under the heading "$R^1$", delete "-$OOCH_2CN$" and insert --- -$COCH_2CN$---.

UNITED STATES PATENT OFFICE
CERTIFICATE OF CORRECTION

PO-1050 (5/69)

Patent No. 3,763,141      Dated October 2, 1973

Inventor(s) Max A. Weaver and Herman S. Pridgen

It is certified that error appears in the above-identified patent and that said Letters Patent are hereby corrected as shown below:

- 3 -

Columns 9 and 10, in the Table, Example 66, under the heading "$R^3$", delete "$-OH_2-$" and insert --- $-CH_2-$ ---.

Columns 9 and 10, in the Table, Example 68, under the heading "$R^3$", delete "$-HH_2-$" and insert --- $-CH_2-$ ---.

Columns 9 and 10, in the Table, Example 70, under the heading "$R^2$", delete "$-H_2$" and insert --- $-Cl$ ---.

Columns 9 and 10, in the Table, Example 73, under the heading "$R^1$", delete "$-COCC_3$" and insert --- $-COCH_3$ ---.

Columns 9 and 10, in the Table, Example 74, under the heading "$(Y)_n$", delete "$4-SO_2\rightleftharpoons 4H^1$" and insert --- $4-SO_2C_4H_9$ ---.

Columns 9 and 10, in the Table, Example 76, under the heading "$R^1$", delete "$-COO\rightleftharpoons]H_5$" and insert --- $-COOC_2H_5$ ---.

Columns 9 and 10, in the Table, Example 78, under the heading "$R^1$", delete "$-CONH\rightleftharpoons_2H_5$" and insert --- $-CONHC_2H_5$ ---.

Columns 9 and 10, in the Table, Example 79, under the heading "$R^1$", delete "$-CO\rightleftharpoons H_3$" and insert --- $-COCH_3$ ---.

Columns 9 and 10, in the Table, Example 80, under the heading "$(Y)_n$", delete "$2-CO_2CH_3-4-NO_2$" and insert --- $2-SO_2CH_3-4-NO_2$ ---.

Columns 9 and 10, in the Table, Example 80, under the heading "$R^1$", delete "$-CO\rightleftharpoons H_3$" and insert --- $-COCH_3$ ---.

Columns 9 and 10, in the Table, Example 81, under the heading "$(Y)_n$", delete "$2-CO_2CH_3-4-NO_2$" and insert --- $2-SO_2CH_3-4-NO_2$ ---.

UNITED STATES PATENT OFFICE
CERTIFICATE OF CORRECTION

Patent No. 3,763,141      Dated October 2, 1973

Inventor(s) Max A. Weaver and Herman S. Pridgen

It is certified that error appears in the above-identified patent and that said Letters Patent are hereby corrected as shown below:

— 4 —

Columns 9 and 10, in the Table, Example 81, under the heading "$R^1$", delete "-$CO\approx H_3$" and insert --- -$COCH_3$---.

Columns 9 and 10, in the Table, Example 82, under the heading "$(Y)_n$", delete "$2-CO_2CH_3-4-NO_2$" and insert ---$2-SO_2CH_3-4-NO_2$---.

Columns 9 and 10, in the Table, Example 83, under the heading "$(Y)_n$", delete "$4-CO_2NH_2$" and insert ---$4-SO_2NH_2$---.

Columns 9 and 10, in the Table, Example 83, under the heading "$R^1$", delete "-$COO\approx_2H_5$" and insert --- -$COOC_2H_5$---.

Columns 9 and 10, in the Table, Example 85, under the heading "$R^1$", delete "-$COO\approx_2H_5$" and insert --- -$COOC_2H_5$---.

Columns 9 and 10, in the Table, Example 86, under the heading "$R^1$", delete "-$OC\approx H_3$" and insert --- -$COCH_3$---.

Columns 9 and 10, in the Table, Example 87, under the heading "$R^1$", delete "-$OC\approx H_3$" and insert --- -$COCH_3$---.

Columns 9 and 10, in the Table, Example 88, under the heading "$R^1$", delete "-$OC\approx H_3$" and insert --- -$COCH_3$---.

Columns 9 and 10, in the Table, Example 117, under the heading "$R^1$", delete "-$CO-C_6H_4-p-CH_3$" and insert --- -$CO-C_6H_4-p-OCH_3$---.

Columns 9 and 10, in the Table, Example 118, under the heading "$R^1$", delete "$-\overset{O}{\overset{\|}{C}}O-C_6H_5$" and insert --- $-\overset{O}{\overset{\|}{C}}O-C_6H_5$---.

Columns 9 and 10, in the Table, Example 121, under the heading "$R^1$", delete "-$COCO_3$" and insert --- -$COCH_3$---.

UNITED STATES PATENT OFFICE
CERTIFICATE OF CORRECTION

PO-1050 (5/69)

Patent No. 3,763,141    Dated October 2, 1973

Inventor(s) Max A. Weaver and Herman S. Pridgen

It is certified that error appears in the above-identified patent and that said Letters Patent are hereby corrected as shown below:

- 5 -

Columns 9 and 10, in the Table, Example 123, under the heading "$R^5$", delete "4-OCH$_2$-" and insert ---4-OCH$_3$---.

Columns 11 and 12, in the Table, Example 149, under the heading "$R^2$", delete "-COH$_3$" and insert --- -OCH$_3$---.

Columns 11 and 12, in the Table, Example 153, under the heading "$(Y)_n$", delete "2,4-di-NO$_2$-6-SO$_2$NHC]H$_5$" and insert ---2,4-di-NO$_2$-6-SO$_2$NHC$_2$H$_5$---.

Columns 11 and 12, in the Table, Example 154, under the heading "$R^1$", delete "-COCH$_2$" and insert --- -COCH$_3$ ---.

Columns 11 and 12, in the Table, Example 158, under the heading "$(Y)_n$", delete "2-COCHO$_2$-4,6-di-NO$_2$" and insert ---2-COOCH$_2$-4,6-di-NO$_2$---.

Columns 11 and 12, in the Table, Example 158, under the heading "$R^2$", delete "-OCH$_2$" and insert --- -OCH$_3$---.

Column 11, line 45, after the word "invention" insert ---can---.

Column 12, line 48, after "dimethyl-" insert ---terephthalate or from cyclohexanedimethanol and di- ---.

Column 13, line 30, Claim 1, delete "fonly" and insert ---fonyl---.

Column 14, Claim 7, delete the formula and insert

---
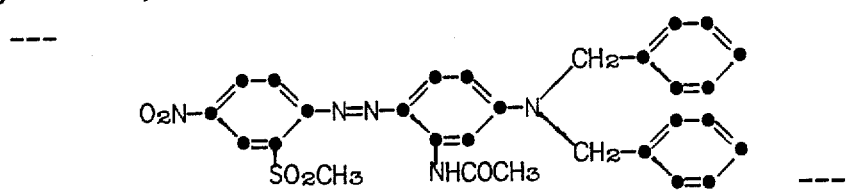
---

UNITED STATES PATENT OFFICE
CERTIFICATE OF CORRECTION

Patent No. 3,763,141      Dated October 2, 1973

Inventor(s) Max A. Weaver and Herman S. Pridgen

It is certified that error appears in the above-identified patent and that said Letters Patent are hereby corrected as shown below:

- 6 -

Column 14, Claim 9, delete the formula and insert

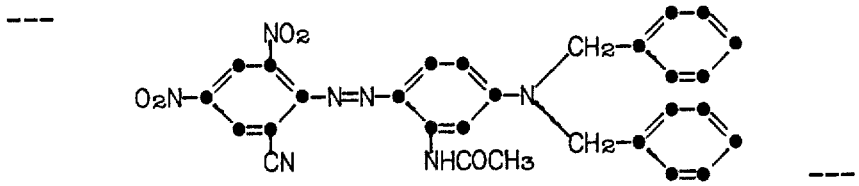

Signed and sealed this 7th day of May 1974.

(SEAL)
Attest:

EDWARD M. FLETCHER, JR.
Attesting Officer

C. MARSHALL DANN
Commissioner of Patents